Jan. 17, 1956 H. ERNST 2,730,843

CAMBERING MECHANISM

Filed June 25, 1954 7 Sheets-Sheet 1

INVENTOR.
HANS ERNST

BY H. K. Parsons & C. W. Wright.

ATTORNEYS.

Jan. 17, 1956 H. ERNST 2,730,843

CAMBERING MECHANISM

Filed June 25, 1954 7 Sheets-Sheet 2

INVENTOR.
HANS ERNST
BY
H. K. Parsons & L. W. Wright
ATTORNEYS.

Jan. 17, 1956 H. ERNST 2,730,843

CAMBERING MECHANISM

Filed June 25, 1954 7 Sheets-Sheet 3

INVENTOR.
HANS ERNST

BY H. K. Parsons & L. W. Wright.

ATTORNEYS.

Jan. 17, 1956 H. ERNST 2,730,843

CAMBERING MECHANISM

Filed June 25, 1954 7 Sheets-Sheet 4

INVENTOR.
HANS ERNST

BY H. K. Parsons & L. W. Wright

ATTORNEYS.

Jan. 17, 1956 H. ERNST 2,730,843

CAMBERING MECHANISM

Filed June 25, 1954 7 Sheets-Sheet 5

INVENTOR.
HANS ERNST

BY
H. K. Parsons & L. W. Wright
ATTORNEYS.

Jan. 17, 1956

H. ERNST 2,730,843

CAMBERING MECHANISM

Filed June 25, 1954

7 Sheets-Sheet 6

INVENTOR.
HANS ERNST
BY H. K. Parsons & L. W. Wright
ATTORNEYS.

CAMBERING MECHANISM

Filed June 25, 1954 7 Sheets-Sheet 7

INVENTOR.
HANS ERNST
BY H. K. Parsons & L. W. Wright
ATTORNEYS.

United States Patent Office 2,730,843

Patented Jan. 17, 1956

2,730,843

CAMBERING MECHANISM

Hans Ernst, Cincinnati, Ohio, assignor to The Cincinnati Milling Machine Co., Cincinnati, Ohio, a corporation of Ohio Application June 25, 1954, Serial No. 439,380

12 Claims. (Cl. 51—94)

This invention relates to a cambering mechanism for roll grinding machines and the like.

The formation and finishing of surfaces other than straight cylindrical surfaces is recognized as a difficult problem as, for example, the formation of cambered surfaces on rolls which have to be generated to suit a particular need. In the art of rolling materials, and especially metals, some of which are relatively hard, such as steel, while others are relatively soft such as brass and tinfoil, the shape of the cambered surface on the roll will vary in accordance with the hardness of the metal because the camber is a function of the bending force imparted to the rolls by the metal passing between them. It now becomes obvious that for the same set-up of rolls, the deflection caused by hard materials will be different than that caused by soft materials and therefore the geometrical shape of the camber is different. Due to the inadequacy of present equipment, it is impossible to generate accurately a particular geometrical shape in accordance with its mathematical formula, and therefore such shapes have been somewhat of a compromise, being based on rule-of-thumb methods and long experience in the art. Another important factor in producing cambered rolls is the finish or polish of the rolling surface because each blemish or imperfection in such surface will be reproduced to a varying degree in the surface of the material being rolled. Therefore, it is not only important to produce the proper shape but also to do it in such a way that a highly polished surface will be produced which is free of any grinding or feed lines.

One of the common roll cambering mechanisms used in the past is exemplified by the tilting wheel head cambering unit. The camber or crown on the roll is generated by synchronization of table traverse with the tilting action of the wheel head which advances or retracts the grinding wheel relative to the work. The tilting action of the wheel head is governed by a cam driven by the table which determines the desired concave or convex contour of the roll. Aside from the undesirabiity of using a tilting wheel head because it does not grind on center all the time, this device provides a shifting contact area between work and wheel face. Either the left or the right edge of the grinding wheel face is contacting the work dependent upon the direction of feed, resulting in unwanted feed lines. Furthermore, due to the shifting contact area inaccuracies in the shape are produced.

Another type is represented by the sine bar cambering mechanism. The principal elements employed are a stationary wheel head, a swivel table and a sine bar. The sine bar compels the swivel table supporting the roll to rotate about its fulcrum during table traverse, thereby creating an infeed motion, the magnitude of which is dependent upon the sine bar angle and the table length. On this device the contact angle between work and wheel is comparatively more convergent but falls short of a perfect tangent grinding wheel face contact because of the fixed fulcrum.

The object of the present invention is to obtain a new approach to the problem of cambering by development of a new mechanism that will achieve perfect tangency between the work and grinding wheel face for any amount of camber, in combination with a parabolic curvature or crown, thereby establishing affinity with a deflection curve of a loaded beam.

In this invention, instead of a tilting wheel head being used, a rigidly mounted one, such as found in standard commercial grinding machines, is utilized, and a floating support for opposite ends of the roll is provided having independent parabolic cams for moving the opposite ends of the roll in predetermined relation. In practice, the roll is carried on two journal rests which contain mechanism for camber reduction, along with measuring instruments permitting direct reading of the camber being obtained during operation. An inclined rail attached to the bed of the machine controls the motion of the cams. From the foregoing description it is evident that the cambering mechanism is not any more an integral part of the roll grinder but has become a mere attachment which can be mounted on any standard machine.

Another object of this invention is to provide a new and improved mechanism for generating a parabolic surface on the exterior of a revolving workpiece.

A further object of this invention is to provide a new and improved cambering mechanism for grinding machines in which the grinding action is centralized at all times on the middle portion of the grinding wheel face, thereby producing a more accurate shape on the work and insuring a finish on the surface which is free of grinding lines.

Another object of this invention is to produce a mechanism for supporting the roll during a camber grinding operation which makes it possible to always maintain the tangent line to the parabolic surface at the point of contact with the grinding wheel parallel to the face of the grinding wheel or to the axis of rotation of the grinding wheel.

Still another object of this invention is to produce a cambering mechanism which will generate a mathematically true parabolic surface.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1:
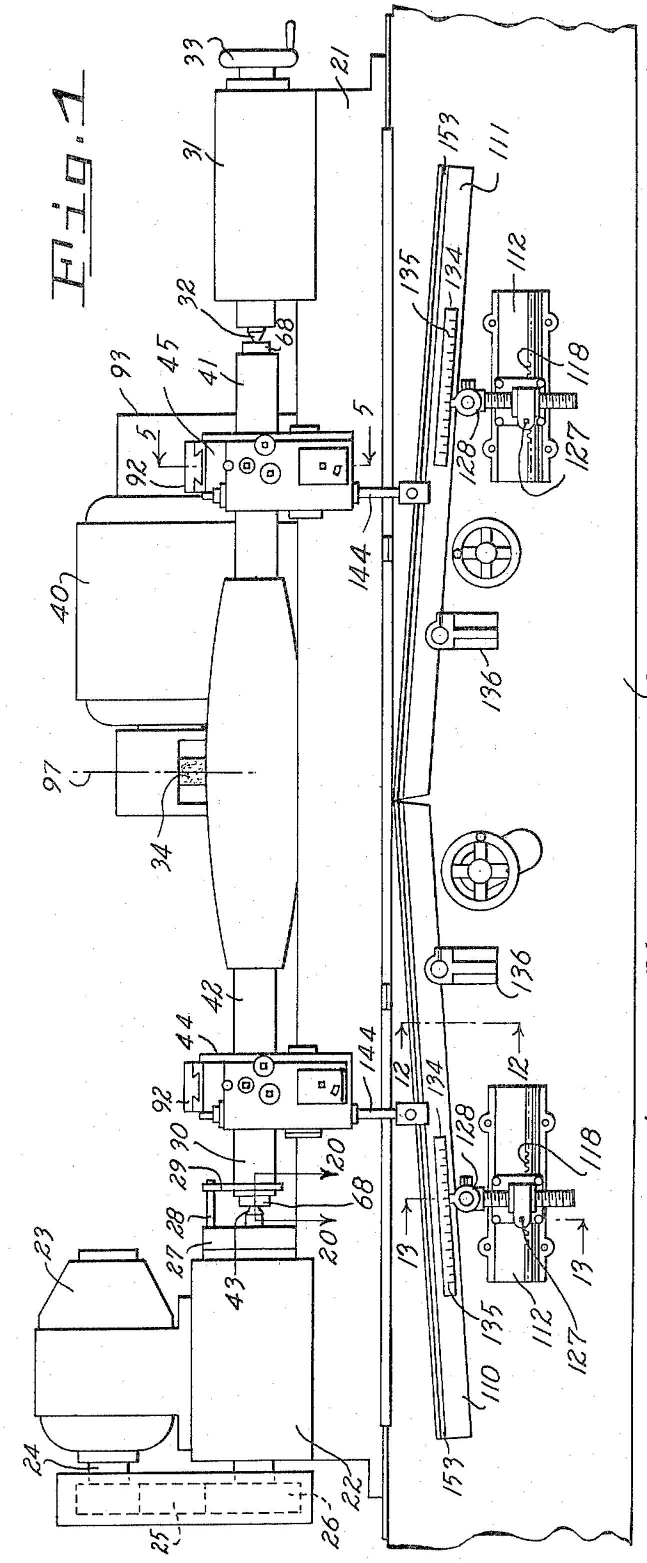
Figure 1 is a front elevation of a roll grinding machine showing the application of this invention.
Figure 3:
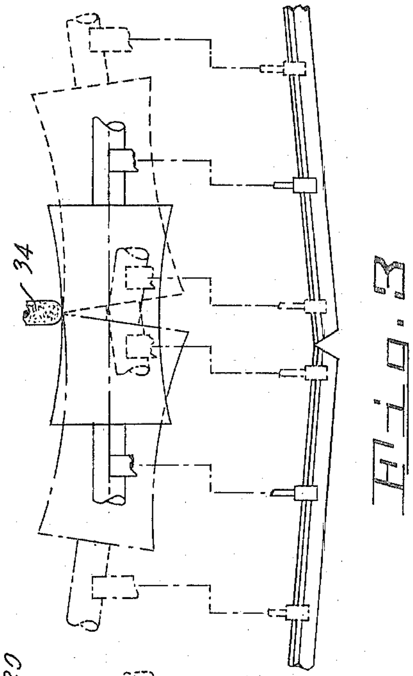
Figure 3 is a diagrammatic view showing the steps in grinding a concave surface on a roll.
Figures 4, 10, 11, 12, 13:
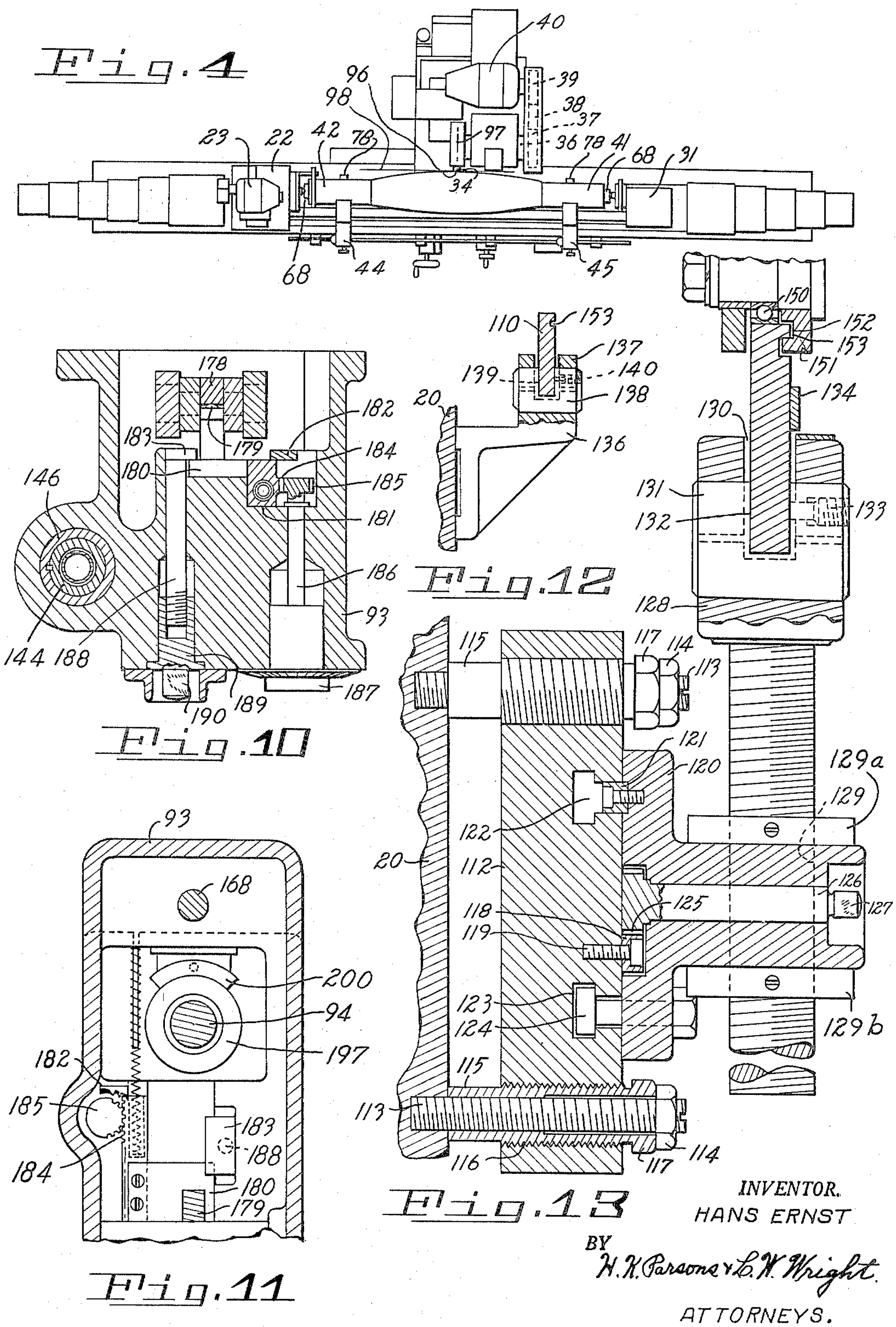
Figure 4 is a plan view of the machine shown in Figure 1.
Figure 10 is a detail section on the line 10—10 of Figure 6.
Figure 11 is a detail secion on the line 11—11 of Figure 5.
Figure 12 is a detail section on the line 12—12 of Figure 1.
Figure 13 is a detail section on the line 13—13 of Figure 1.

In Figures 1 and 4 there is shown an adaptation of this invention to a conventional grinding machine. In Figure 1 the reference numeral 20 indicates the bed of a grinding machine upon which is slidably mounted a work supporting table 21. The table has a headstock 22 adjustably mounted on one end thereof which carries an electric motor 23 for driving the headstock. The armature shaft 24 of the motor is connected by suitable flexible drive 25 to the headstock pulley 26. This pulley drives a face plate 27 which carries a driving pin 28. A suitable driving dog 29 is attached to the end of the workpiece 30 in operative engagement with the driving pin 28. The other end of the table is provided with a tailstock 31 having a work supporting center 32 which is axially adjustable by conventional means including a hand wheel 33.

The machine is also provided with a grinding wheel 34 mounted on the end of a spindle journaled in a spindle carrier 36. One end of the spindle 35 is provided with a suitable driving member 37 which is connected by belts or the like 38 to a motor pulley 39 of a prime mover, such as an electric motor 40. In this machine the grinding wheel is adjustable to and from the work while the work table travels longitudinally of the grinding wheel. Thus, the machine constitutes a conventional grinding machine in which the table may be translated by any suitable or conventional driving means, such as the rack and pinion means 20′, Figure 5 relative to the grinding wheel, and the grinding wheel is adjustable toward and from the work table.

It is the general practice to support a roll in a grinding machine by means of its journals, such as 41 and 42, which project from opposite ends of the roll as shown in Figure 1, so that the roll will rotate about the same axis as it does in a mill. When the roll is placed in the grinding machine, it is first supported on the head and tailstock centers 43 and 32 respectively. This operation aligns the axis of the work parallel to the axis of the grinding wheel. The machine is provided with two journal rests indicated generally by the reference numerals 44 and 45 in Figure 1, and shown in greater detail in Figures 5 and 18. As there shown, the journal rest comprises a pad 46 having a pair of angle blocks 47 and 48. With the workpiece supported on the centers, the journal rests, comprising the parts 46, 47, and 48, are elevated by the mechanism shown in Figure 18 against the underside of the journal sufficiently to take the load of the workpiece off of the centers.

Figures 18, 20:
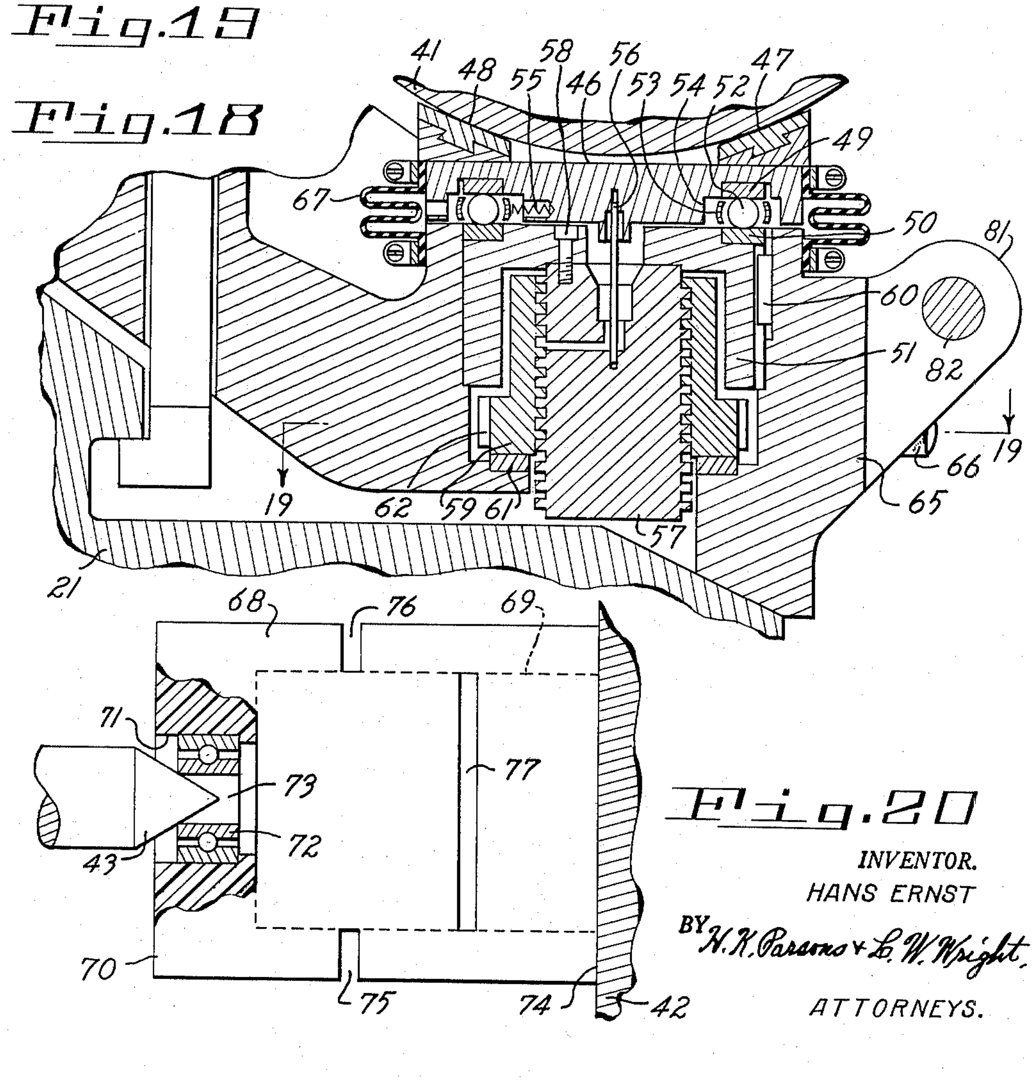
Figure 18 is a detail section showing the elevating mechanism in the journal rest.
Figure 20 is a section on line 20—20 of Figure 1.

To allow for the lateral swiveling of the journals during the grinding operation, to position the successive tangents parallel to the wheel face, the part 46 is supported for a small floating movement in a horizontal plane, without changing the height of the work with respect to the grinding wheel, by means comprising two annular bearing rings 49 and 50, Figure 18, the ring 49 being fixed to the member 46, and the ring 50 being attached to the top of a vertically adjustable member 51. Between the two rings are a plurality of anti-friction balls 52 held in the usual retainer rings 53, and, between a shoulder 54 on the member 46 and the retainer ring 53, there are a plurality of radial springs 55, preferably three, to permit limited universal movement of the anti-friction balls on the supporting ring 50.

A resilient rod 56 is connected at one end to the elevating screw member 57, and at the other end to the member 46 to act as a centralizing means to hold the journal rest in a normal central position with respect to the axis of the elevating screw member. It will be noted that the support 51 is attached by suitable screws 58 to the top of the member 57 which, in turn, is threaded in a nut member 59. When the nut member is rotated, the parts 51 and 57 are held against rotation by a key 60.

Figure 19:
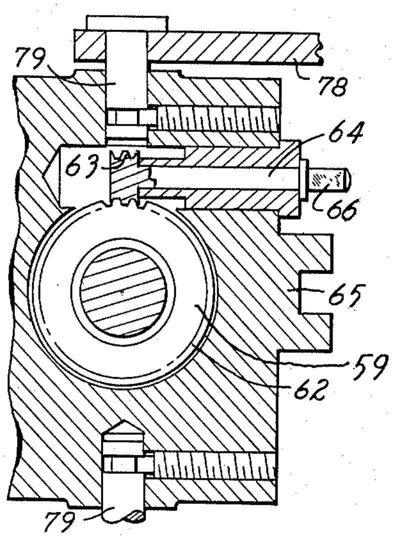
Figure 19 is a section on line 19—19 of Figure 18.

The nut member 59 is supported on a bronze ring 61 and has worm gear teeth 62 on its periphery which mesh with a worm 63, Figure 19, on the end of a shaft 64. This shaft projects from the journal rest housing 65, where it is provided with a square end 66 to which a suitable wrench may be applied to effect elevation of the journal rest into suitable pressural contact with the underside of the workpiece. An expandible packing 67 of suitable form may be attached at opposite ends to the members 46 and housing 65 to keep dirt and other extraneous material from the anti-friction support.

It will be noted that the journal rests merely support the weight of the work, and it is therefore necessary to provide other means for confining the work against axial movement, and controlling its lateral movement. After the weight of the workpiece has been suitably transferred to the journal rest, the work supporting centers 43 and 32 are withdrawn, and flexible end stop members are inserted between the end of the workpiece and the center to hold the workpiece against movement. One of these end stop members is shown in Figure 20 and comprises a cup-shaped member 68 having an internal bore 69 and an end wall 70.

This member is preferably made out of formica, because it is waterproof and will not swell when it comes in contact with the liquid coolant used in grinding. The end wall 70 has a suitable bore 71 in which is fitted an anti-friction bearing 72, the bore 73 of which fits the center, such as the work supporting center 43. The other end face 74 is held against the end of the work by advancement of the center 43. To obtain suitable flexibility, the member 68 has a first pair of cross slots 75, 76, and a second pair 77 cut therein and at right angles. It will be understood that one of these flexible end stops is provided at each end of the workpiece to permit limited lateral movement of the journal members during rotation of the workpiece while still restraining the workpiece against axial movement.

By means of this invention it is possible to grind both convex and concave surfaces but for illustrative purposes the explanation will be directed first to the grinding of convex contours.

Figure 5:
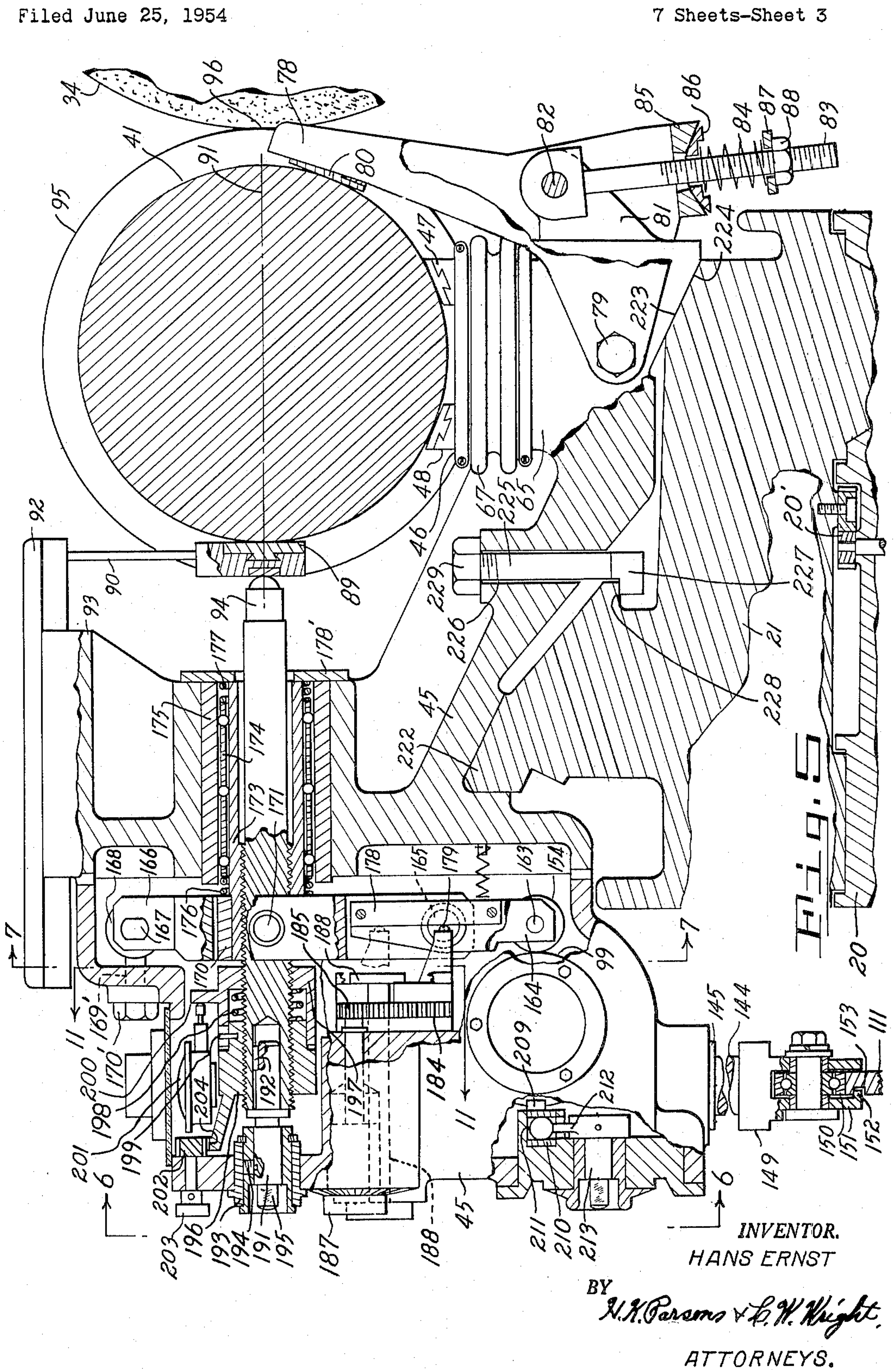
Figure 5 is a section through one of the journal rests as viewed on the line 5—5 of Figure 1.

The means for confining and controlling the lateral or swivel movement of the journals, in addition to the centralizing means of the journal rest, is shown in Figure 5, and comprises a back rest member 78 which is supported on the journal rest assembly by a pivot pin 79, which is located to lie substantially under the center of the workpiece. This member carries an anti-friction pad 80 which bears against the periphery of the journal member 41. The housing 65 has a bifurcated lug 81 projecting from the rear thereof, and between the ears of this lug there is pivoted on the pintle pin 82 an elongated threaded rod 83, which has a spring 84 mounted thereon for engaging a fixed part 85 of the lever 78 to effect and maintain a counterclockwise rotational urge on the pad 80 into engagement with the workpiece. A hemi-spherical washer 86 is interposed between the spring and the member 85 to prevent binding of the parts. A washer 87 and adjusting nut 88 are threaded on the rod 83 for adjusting the tension of the spring 84.

To oppose the lateral urge of the backrest, there is mounted on the other side of the workpiece a second anti-friction pad 89, which is supported by a flexible rod 90 in such position that the pad 89 is substantially opposite the axis of rotation of the journal and thereby opposite to the action of the grinding wheel which normally would be tangent at some place along the diametrical plane 91 passing through the workpiece and the center of the pad 89 as the grinding progresses. The rod 90 is supported on the end of a dovetailed slide 92 mounted on the upstanding part 93 of the journal rest housing 65. The pad 89 is positively backed up by a plunger 94 which is positively held in fixed positions and is the member that actually controls the lateral movement of the journals. It will be apparent that upon advancing movement of the plunger 94, as viewed in Figure 5, the journal 41 will be moved to the right, and, upon retractive movement of the plunger 94, the backrest 78 will cause the journal 41 to follow up the movement of the plunger and move the journal to the left.

Cambered surfaces have a high point of camber which is really a circle constituting the largest diameter of the workpiece, such as the circle 95, indicated in Figure 5, but since it is necessary to deal with the profile or cross sectional shape to be produced and disregarding rotation of the work, the high point of camber will be indicated by any point 96 on the circle 95 which is also the point of tangency between the face of the grinding wheel 34 and the circle 95, when the grinding wheel is centered lengthwise of the workpiece as shown in Figures 1 and 4. The cross sectional plane through the workpiece on the circle 95 may be termed, for the purpose of this explanation, as the neutral plane, and the starting position for explanation of the machine cycle. This neutral plane will be coincident with the central plane 97 passing through the center of the grinding wheel perpendicular to its axis of rotation. This results in the tangent line 98, Figure 4, to the camber surface at the point 96 being parallel to the axis of the grinding wheel, the axis of rotation of the work, and the direction of relative feeding movement between the work and the wheel; and therefore the line 98, extended for the full length of the workpiece, may be termed as the grinding line, because it is along this line that the periphery of the cambered surface will be tangent to the grinding wheel face throughout the grinding operation.

If the face of the grinding wheel 34 is square with the central plane 97 of the wheel it will be obvious that the grinding action will be confined, theoretically at least, to the center portion of the wheel face throughout the grinding operation whereby the edges of the wheel will never come in contact with the work surface to produce grinding lines thereon.

As previously stated, the new method of operation of this invention is to continuously place the tangent at the successive points along the parabolic contour in parallel relation to the grinding wheel face as the relative feeding movement between the wheel and the work progresses. If the grinding wheel did the traveling it would generate the imaginary grinding line 98 passing across the face of the grinding wheel parallel to the axis of the wheel. Thus, the tangents are moved automatically and successively into superimposed relation to the grinding line. In this invention the work is the element that is traversed, and is also the element which is swiveled to superimpose the tangents on the grinding line.

To accomplish this automatic swiveling action, each journal rest assembly is provided with a control cam, one of which is indicated by the reference numeral 99 in Figure 5, which is operatively connected, through a mechanism to be explained, to the plunger 94. These cams are so shaped that upon simultaneous movement but in opposite directions, one journal of the roll will be moved toward the grinding wheel, and the other journal will be moved away from the grinding wheel, but these movements are unequal and therefore there is no definite pivot point about which the workpiece swivels.

Figure 21:
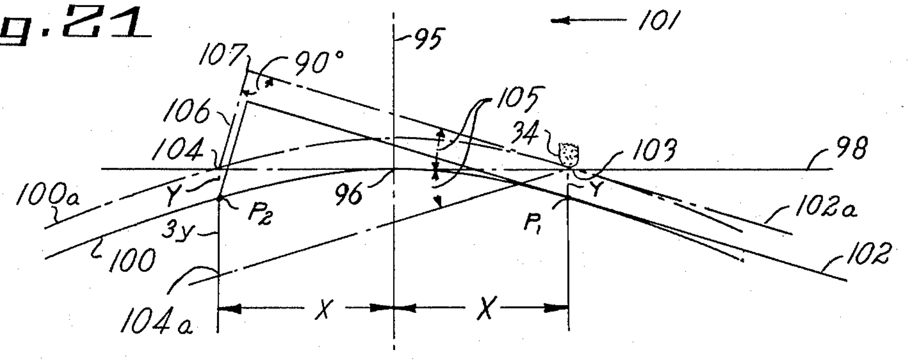
Figures 21 and 22 are geometrical diagrams.

Although the two ends of the workpiece are actually swiveled simultaneously in opposite directions, for explanatory purposes and easier understanding, the resultant movement can be considered as two separate movements. For instance, in the diagram, Figure 21, assume $P_1$ and $P_2$ are two points on the parabolic curve 100 representing the cross sectional profile of a cambered roll, and these points are equally spaced on opposite sides of the high point of camber 96, which is the center longitudinally of the roll. If the roll were moved toward the left in the direction of the arrow 101 to place the grinding wheel 34 opposite the point $P_1$, this point would have to be moved through the distance Y to contact the grinding wheel and to move the line of tangency 102 parallel with the face of the wheel.

The first movement could, therefore, be considered as moving the entire curve 100 toward the grinding wheel a distance Y whereby the tangent 102 will intersect the grinding line 98 at the point 103; and the second movement would consist of rotating the tangent 102 about the point 103 as a center to position the tangent in coincidence with the grinding line 98. The parabolic curve 100 first assumes the position 100*a* and the tangent line 102 assumes the position 102*a*. The point $P_2$ will also be advanced through the distance Y to the point 104 on the grinding line. It will now be seen that in order to bring the tangent 102 into coincidence with the grinding line 98 that it must be rotated through the angle 105 in a counterclockwise direction.

If a force was applied at the point $P_1$ and effective to move it through the distance Y to the point 103, the next question would be how far must the point 104 be moved in a direction opposite to the application of the force to the point $P_1$ to rotate the tangent 102*a* through the angle 105 into coincidence with the line 98. This distance may be found graphically by extending the tangent 102*a* and erecting a perpendicular 106 to it in such position that it will pass through the point 104. The length of the line 106 will be the distance that the point 104 must be moved to rotate the triangle 103—104—107 in a counterclockwise direction to bring the tangent line 102*a* into coincidence with the grinding line 98. The length of the line 106 may be computed as follows: the points $P_1$ and $P_2$ are equally spaced on opposite sides of the central plane 95, each a distance $x$ and therefore the total length of the hypoteneuse 103—104 of the triangle is equal to $2x$. Therefore, $$\text{Length of line } \mathbf{106} = \text{sine angle } \mathbf{105}\ (2x)$$

When the triangle is rotated, the point 104 will move to the point 104*a*. In actual practice, the point $P_2$ would be moved directly to the point 104*a*, omitting movement $y$, and so the above equation for the distance that the point $P_2$ would actually be moved would read:

$$\text{Movement of point } P_2 = \sin \text{ angle } \mathbf{105}(2x) - y$$

The recognized equation for a parabola is $Y = Ax^2$. By differentiating this equation we get:

$$\text{Tangent angle } \mathbf{105} = 2AX$$

wherein A is a constant. In the above equation, by multiplying the sine of the angle 105 by $$\frac{\cos}{\cos} \text{ and since } \frac{1}{\cos} = \sqrt{1 + \text{tangent}^2\ 105}$$

the equation can be converted to read:

$$106 = \text{tangent angle } 105\ (2x) - y\sqrt{1 + \text{tangent}^2\ 105}$$

By substituting the value of 2AX for the tangent, the above equation will read:

$$\text{line } 106 = \frac{4AX^2}{\sqrt{1 + 4a^2x^2}} - Ax^2$$

Since the value of the constant A is very small, even for large cambers, the above equation reduces to $$\text{line } 106 = 3AX^2 \text{ or line } 106 = 3y.$$

This means that the distance from the point $P_2$ to the point 104A is equal to $3y$ as compared to $y$ which is the distance from the point $P_1$ to the point 103. In other words, by simultaneously moving the points $P_1$ and $P_2$ through the distances $y$ and $3y$ respectively but in opposite directions the tangene 102*a* will be moved into coincidence with the grinding line 98.

Figure 22:
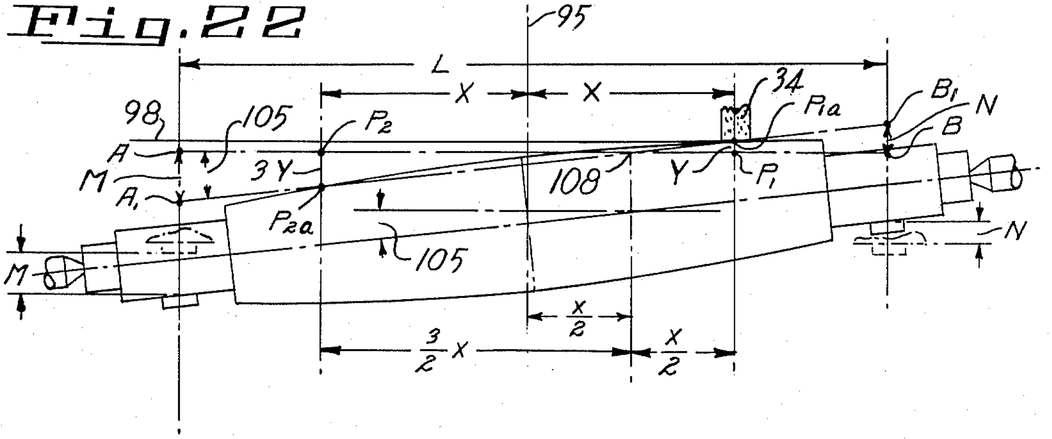

Having thus obtained the values for the movement of points $P_1$ and $P_2$ which it must be remembered are points on the parabolic curve and equally spaced on opposite sides of the central plane, the values for the movements to be imparted to the points A and B on the journals of the roll can be computed. First, the distance between these two points will be known, and this may be indicated in the diagram, Figure 22, by the distance L. The chord $P_{1a}$, $P_{2a}$ will cross the original chord $P_1$, $P_2$ at the point 108 because $$\frac{3y}{3/2x} = \frac{4}{1/2x}$$

Therefore, in the triange 108, A, A', $$\frac{3y}{3/2x} = \frac{M}{L/2 \text{ plus } \frac{X}{2}}$$

This reduces to:

$$M = Y\ (L/x \text{ plus } 1)$$

Since $$Y = Ax^2$$

we can write:

$$M = Ax\ (L \text{ plus } x);$$

likewise, $$N = Ax\ (L - x)$$

It is desired to point out at this time the relationship between the elements shown in the diagram and the machine movements. The distance X represents the length of the longitudinal feed movement between the grinding wheel and the work from the central position as shown in Figure 1 to position the point $P_1$ opposite the grinding wheel, and the distance $y$ represents the distance that the point $P_1$ must be moved to engage the grinding wheel. It will be noted that the distance $y$ will vary as the square of the distance $x$ because of the parabolic formula that $Y = Ax^2$. This also means that the distance N will also vary as the square of the distance B from the central plane 95. This proves that the cam acting at the point B must be a parabolic cam, as well as the cam acting at the point A.

The motion for rotating the cams that impart the swiveling movement to the table is derived from the feeding movement of the table by the use of straight sine bars mounted on the bed. There are two sine bars 110 and 111, as shown in Figure 1, and the means for supporting them on the bed is shown in Figure 13. A guide plate 112 is mounted in spaced relation to the bed by a series of screws 113 threaded in the bed and carrying a lock nut 114. A spacing sleeve 115 surrounds the screw 113 in abutting relation at one end to the bed 20, and has a threaded connection 116 to the plate 112. By means of a squared end 117, the member 115 may be rotated to determine the spacing between the member 112 and the bed of the machine. When this has been determined the lock nut 114 is tightened.

The plate 112 carries a rack bar 118 extending longitudinally of the bed and secured to the plate by suitable screws 119. A slidable bracket 120 is guided on the member 112 by suitable keying means 121 fitting in T slot 122, there being a second T slot 123 in which is fitted clamping T bolts 124. The bracket has a pinion 125 journaled by its stem 126 in the bracket, the pinion meshing with the rack 118. By turning of the exposed end 127 of the stem 126, the bracket 120 may be longitudinally adjusted along the member 112, and when in suitable position may be clamped by the T bolts 124.

A sine bar support 128 is slidably mounted in bore 129 of member 120 for vertical adjustment. A pair of nuts 129*a* and 129*b* are threaded on member 128 to clamp it in position. The upper end of the member 128 is bifurcated to provide a slot 130 in which the sine bar lies, and a rotatable stud 131 passes through the bifurcations and has a slot 132 in which the sine bar is clamped by a screw 133. This permits the sine bar to be oscillated to the desired angle. A scale or indicator plate 134, is secured to the sine bar 110 and has graduations 135, as indicated in Figure 1, so that by adjustment of the bracket 120 longitudinally of these graduations, the angle of inclination of the sine bar will be indicated. The sine bar has a fixed pivot point which comprises a bracket 136 which is secured to the bed, as shown in Figure 12, and provided with a similar bifurcated end 137 which receives the sine bar 110, and a rotatable stud 138 having a slot 139 in which the sine bar is clamped by a set screw 140. Therefore, as one end of the sine bar is moved up or down, the pin 138 will rotate to accommodate the change in angle.

Figure 6:
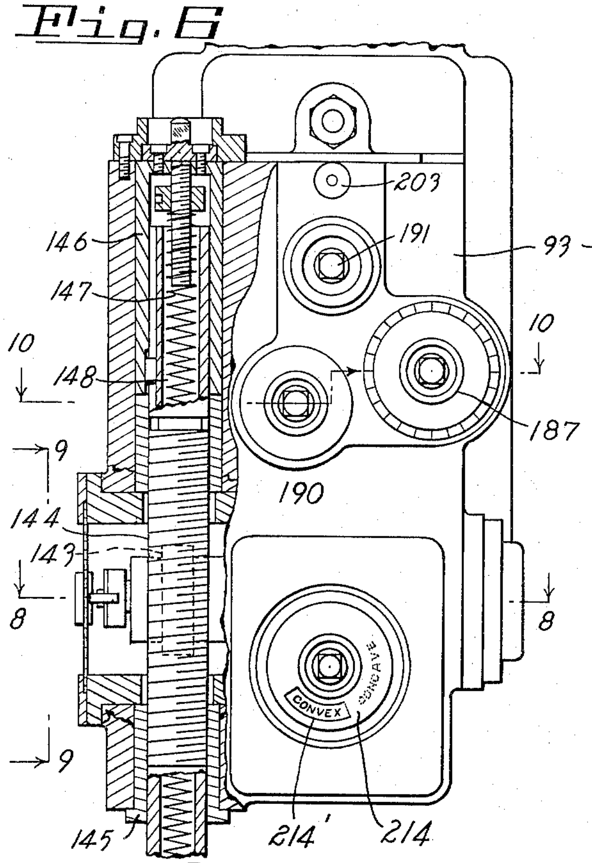
Figure 6 is an end view of the mechanism shown in Figure 5 as viewed on the line 6—6 of Figure 5.
Figure 8:
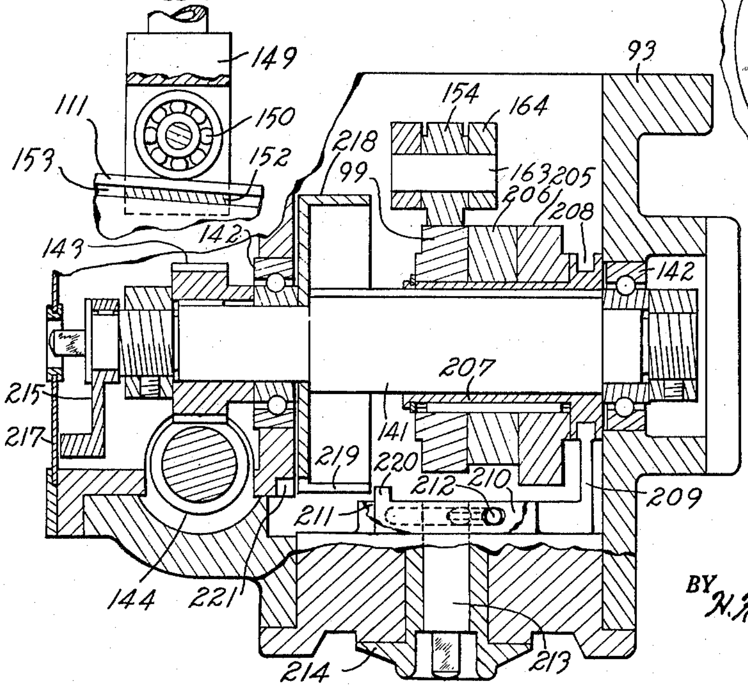
Figure 8 is a detailed section on the line 8—8 of Figure 6.

One of the actuator cams 99 is shown in Figure 8 keyed to a shaft 141 which is journaled on anti-friction bearings 142 mounted in housing 93 for rotation by a pinion 143 suitably keyed and fastened to its end. The pinion meshes with a circular rack bar 144 which is vertically slidable in bushings 145 and 146 in the housing 93 as shown in Figure 6. A spring 147 mounted in the bore 148 of the bar 144 continuously urges the bar in a downward direction toward the cooperating sine bar. Each rack bar has a bifurcated head 149 formed on the lower end thereof in the fork of which is journaled an anti-friction roller 150 which rides on the top of the sine bar 111. As shown in Figures 5 and 13, one of the bifurcations 151 of the member 149 has an inwardly extending lip 152 which rides in a groove 153 formed in the face of the sine bar 111. This slot and groove connection insures that the rack bar will be positively moved up or down, depending upon the slope of the sine bar.

It will now be apparent from Figure 1 that if the work table 21 is moved toward the left that one of the rack bars 144, such as the one on the right, will be moved upward by the sine bar 111 while the other rack bar will be moved downward by the sine bar 110. Since the sine bars are mounted at the same angle the movements of the rack bars will be equal but opposite. Therefore, the angle of rotation of the cams will vary in the same manner so that for every unit of movement of the table there will be the same unit of angular rotation of each cam. The swiveling movement of the journals 41 and 42 effected by the cams, however, will vary as the square because the cams are parabolic in shape.

Figure 2:
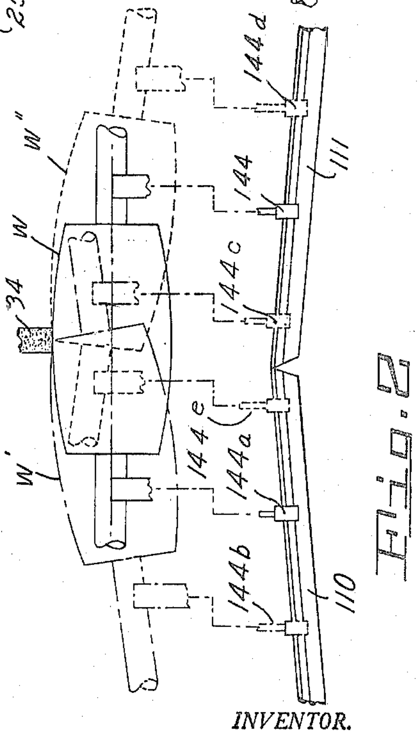
Figure 2 is a diagrammatic view showing the steps in grinding a convex surface on a roll.
Figure 15:
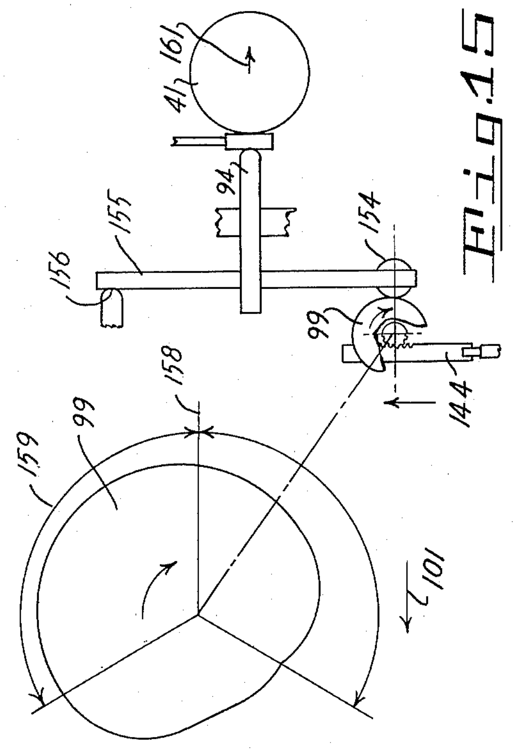
Figure 15 is a diagrammatic view of the other parabolic cam indicating the direction of movement of the parts for the same direction of feed movement as in Figure 14.
Figure 14:
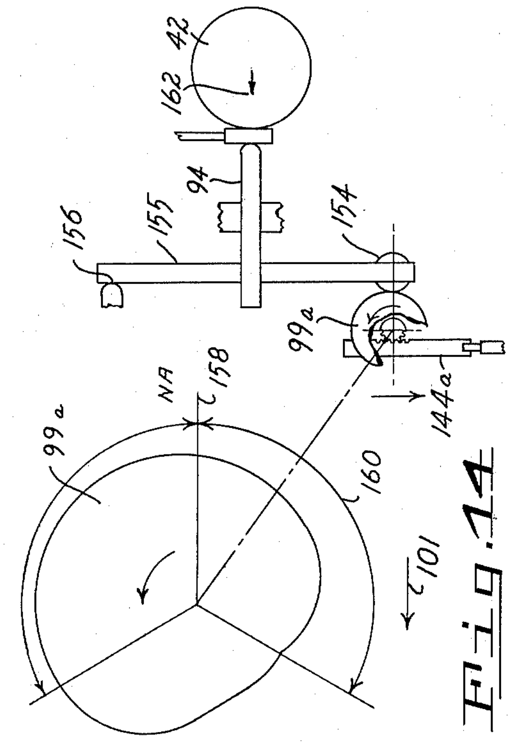
Figure 14 is a diagrammatic view showing one of the parabolic cams in a neutral position, and the direction of movement of the parts upon movement from that position.

The shape of the parabolic cams is shown in Figures 14 and 15, and, although the cams have the same shape, for the purposes of identification the cam acting on the journal 41, which is the one on the right in Figure 4, has been designated by the numeral 99, and the one acting on the journal 42 has been designated as 99*a*. The two cams are shown in the position they assume when the workpiece is centrally located with respect to the grinding wheel as shown in Figure 4. The rack bar 144 operates cam 99 while the rock bar 144*a* operates cam 99*a*. When the workpiece W is located centrally of the grinding wheel 34, as shown in Figure 2, the rack bars 144 and 144*a* are substantially midway of the length of the sine bars 111 and 110.

It will be noted that diagrammatically the cam 99 has a follower roller 154 mounted in the end of a lever 155 pivoted at 156 and engaging the pusher 94 at some intermediate point to gain a lever advantage whereby the roller will oscillate through a greater movement than the push rod 94. Referring to Figure 2, if the table moves toward the left as viewed in Figure 2, the rack bar 144 will move to the position 144*c*, the rack bar 144*a* will move to 144*b*, and the workpiece will eventually assume the position W'. Since the rack bar 144 will move upwards as viewed in Figure 2 and the rack bar 144*a* will move downwards, the cam 99 will rotate clockwise as viewed in Figure 15, and the cam 99*a* will rotate counterclockwise. If the radius 158 of cam 99, Figure 15, is considered the neutral radius it will be seen that the arc 159 of the cam becomes the effective arc or surface during clockwise rotation of the cam, while in Figure 14, the arc 160 of cam 99*a* becomes the active surface during simultaneous counterclockwise rotation thereof.

Although it is optional, the effective arcs have been shown as extending through 120 degrees, which means that the full rotation of one cam is 240 degrees, and this is the greatest rotation that can be effected for the full length of table movement. Therefore, for workpieces of lesser length not requiring the full length of table travel less than the full rotation of the cam would be utilized for the same angle of the sine bars. By adjustment of the angle of the sine bars, the amount of rotation can be increased. Thus, the flatter the sine bar angle, the less rotation will be imparted to the cam for a given movement of the table, while if the sine bar is adjusted to a greater angle, more rotation will be imparted to the cam for the same prescribed movement of the table. This makes it possible to average out the use of the cam surface for long and short workpieces. It will be noted that during simultaneous rotation of the cams that the radius of the arc 159 increases from the neutral radius 158, thereby moving the journal 41 to the right as indicated by the arrow 161; and that the radius of the section 160 on the cam 99*a* gradually reduces so that the journal 42 is moved toward the left as indicated by the arrow 162.

Figure 17:
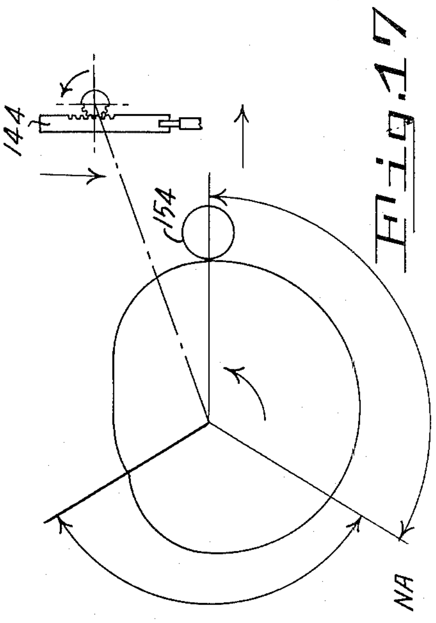
Figure 17 is a diagrammatic view showing the final position of the cam shown in Figure 15.
Figure 16:
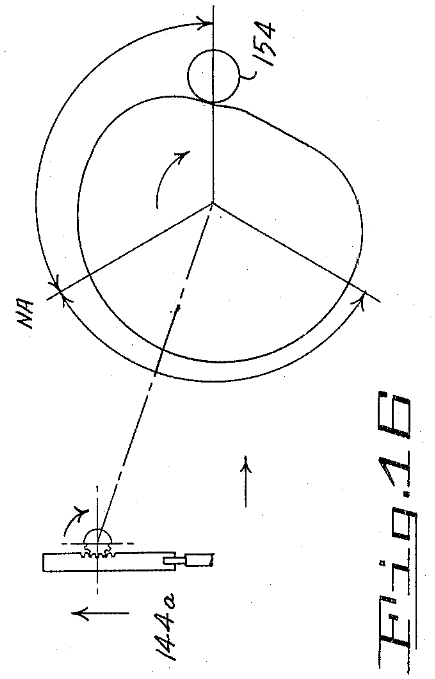
Figure 16 shows the final position of the cam shown in Figure 14.

It will now be seen that both ends of the workpiece are simultaneously swiveled during movement of the table but in opposite directions and by unequal amounts. If the table movement is sufficiently long to effect maximum rotation of the cams, the parts will be in the position shown in Figures 16 and 17 respectively, and upon reversal in the direction of movement of the table, the rack bars 144 and 144*a* will reverse their direction of movement, thereby reversing the direction of rotation of the respective cams. This will result in the journal portion 41 moving to the left as viewed in Figure 15 and the journal portion 42 moving toward the right as viewed in Figure 14. Upon continued movement of the table to the right as viewed in Figure 2, the rack bar 144 will reach the position 144*d*, the rack bar 144*a* will reach the position 144*e*, and the workpiece will be swiveled into the position indicated by W''.

Figure 7:
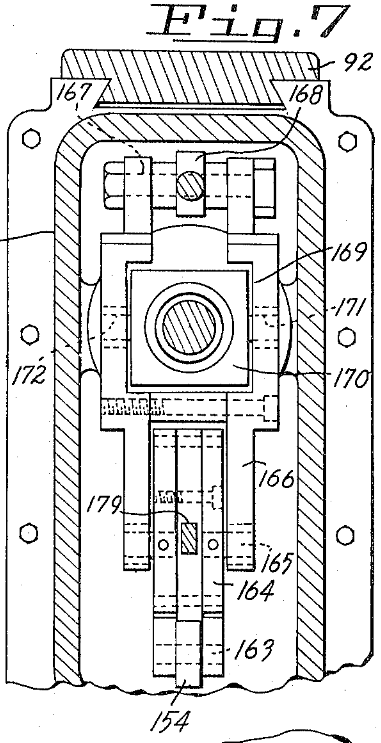
Figure 7 is a detailed section on the line 7—7 of Figure 5.
Figure 9:
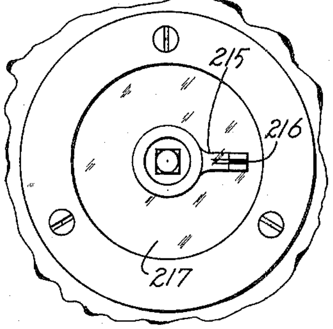
Figure 9 is a detail view on the line 9—9 of Figure 6.

The actual lever mechanism actuated by the cams utilized herein is shown in Figure 5 in which it will be noted that the roller or cam follower 154 is supported by a pin 163 mounted in the bifurcated end of a lever 164, Figure 7, which is pivotally connected at its midpoint by a pin 165 to the bifurcated end of a main lever 166. The lever 166 has a cross pin 167 through its upper end by which it is connected to an eye bolt 168 that passes through a bore 169 in the housing 93 and secured thereto by a nut 170'. The lever 166 has a square opening 169 in which is mounted a block 170 having laterally extending trunnion portions 171 and 72 which are journaled in portions of the lever 166.

The block 170, as shown in Figure 5, has secured in a central bore thereof, an internally threaded sleeve 173, the exterior of which slides in an anti-friction bearing sleeve 174 in bushing 175 mounted in the housing 93. Springs 176 and 177 are interposed between the ends of the anti-friction sleeve, the last spring bearing against a fixed plate 178' whereby the block 170 and its supporting lever 166 are urged in a clockwise direction about the pivot pin 167 to maintain the follower 154 in engagement with the periphery of the cam 99. Since the lever 164 is merely pivotally connected to the lower end of the lever 166 this rotational urge on the lever 166 would cause the lever 164 to pivot about its supporting pin 165.

The lever 164 is a free swinging lever, and an abutment block 178 is secured thereto for engagement by an adjustable fixed pivot 179. As shown in Figure 10, the pivot 179 is carried by a slide 180 which is guided against the surfaces 181 and held by gibs 182 and 183. The member 180 has rack teeth 184 engaged by a pinion 185 which has an elongated stem 186 projecting to the exterior of the housing 93 where it is provided with a rotatable dial 187. After adjustment of the slide, the gib 183 has a rod portion 188 connected thereto which is threaded in a rotatable nut member 189 that may be turned by its square end 190 to clamp the slide in any given position and thereby fix the position of the pivot. By change of the pivot point the effective lever arm of the lever 164 may be adjusted relative to the lever arm of lever 166, and thereby the amount of movement imparted to the pusher rod 94 may be varied for a given rise on the cam 99.

For set-up purposes, the longitudinal position of the plunger 94 may be adjusted relative to the block 170, by means of a rotator 191 having a keyed connection at 192 to the plunger 94. The member 191 is anchored against axial movement in the bushing 193, mounted in the housing, by set-screw 194. Thus, by rotation of the square end 195 by a suitable tool, the plunger 94 may be axially adjusted.

A second nut 196 is threaded on the member 94, and this is part of an indicator mechanism. This includes a backlash eliminating nut 197 threaded on member 94 and held apart from nut 196 by a spring 198. The two nuts are keyed together by pin 199 for simultaneous rotation but independent axial movement to take out backlash. The nut 197 has a lug 200 engaging the plunger of the indicator dial 201.

The nut 196 may be rotated relative to the member 94 to set the dial on zero by a pinion 202 having an operating handle 203. The pinion 202 meshes with gear teeth on the angular flange 204 formed integral with the nut 196. It will now be seen that the member 94 may be axially adjusted by the rotator 191 and that after adjustment the micrometer dial may be set to zero or some other starting point so that upon subsequent operation, the amount of movement of the journal can be read directly. Thus, the amount of camber being effected can be read directly on the dial.

*Concave cambers*

For grinding concave cambered surfaces, a different set of cams is utilized because the swiveling movements are opposite in direction than for convex surfaces. It is possible, however, to mount the concave camber controlling cam on the same shaft with the convex controlling cam, and selector mechanism is provided for choosing the one to use. In Figure 8, the concave controlling cam is indicated by the reference numeral 205, and it is also fixed for rotation with the shaft 141. A spacer 206 is also mounted on the shaft 141 between cams 99 and 205. The cams and spacer are actually fixed on a sleeve 207 which is slidably splined on shaft 141. The sleeve is provided with a shifter groove 208 in which fits a shifter fork 209. The fork is integrally formed on the end of a slide 210 which is slidably mounted in a groove 211, and actuated by a shifter arm 212, Figure 5, attached to the end of a rotator 213. The rotator has fixed to it an indicator plate 214 which, as shown in Figure 6, has a window 214' which exposes either the word "convex" or "concave" to indicate the position of the follower.

While the cams have different shapes, there is one point around their periphery where they have equal radii, and that is the neutral radius which is in contact with the follower when the work is centered longitudinally of the wheel and indicated by numeral 158 in Figure 14. The spacer is made to the same radius, so that under this one condition, the cams may be shifted laterally with respect to the follower 154 smoothly in a straight line without engaging projecting shoulders. To indicate this condition, the shaft 141 has an indicator arm 215 which aligns with a mark 216 etched on an enclosing glass 217 to indicate that the parts are in proper position for shifting. Also, to prevent attempts at shifting when the parts are not in alignment, the shaft has a member 218 attached thereto with a longitudinal slot 219 cut in it which aligns with a projection 220 on the shifter 210 and only allows shifting when they are in alignment. When the shifter is moved to the left, the projection lies in the recess 221.

It will now be obvious that a cambering mechanism has been devised which may be built in the form described for attachment to the table of a conventional roll grinding machine, but it will be understood that the mechanism could be incorporated permanently in the machine without departing from the principles of this invention. In the form illustrated, Figure 5, the journal rest 45 is provided with a V-shaped guide surface which fits the V-guide 222 of the table 21, and a second guide surface 223 which rests on the guide surface 224 of the table 21. This makes it possible for the journal rests to be adjusted along the table to suit the length of work to be ground. After adjustment the journal is clamped into position by the clamping bolt 225, which passes through hole 226 in the journal rest and has a hook end 227 engaging a ledge 228 on the table. By tightening down the nut 229, the rest may be secured to the table for movement therewith.

After the journal rests have been clamped in position, the roll is dropped into position on the centers 43 and 32, and while so supported the journal rests are adjusted by mechanism shown in Figures 18 and 19 to raise the pads 47 and 48 into engagement with the roll sufficiently to take the load so that the centers may be withdrawn. The end stop members are then inserted at the ends of the work and the centers brought back to press them against opposite ends of the work as shown in Figure 20. The pads 80 and 89 are adjusted against opposite sides of the work as shown in Figure 5, whereby the work is held both laterally and longitudinally on the table. By longitudinal adjustment of the table, the center of the roll is positioned on the center of the grinding wheel, and the indicator dial 201 may be adjusted to zero so that upon subsequent operation, the amount of camber being produced may be directly read thereon. The fulcrumed lever mechanism supporting the cam follower can be adjusted and the table traversed with the work out of engagement with the grinding wheel to test the amount of camber produced for the length of roll. After this has been run, the grinding wheel may be adjusted into engagement with the work and the grinding operation may proceed.

It will thus be seen that a new and improved mechanism has been provided for accurately grinding cambered surfaces on rolls.

What is claimed is:

1. In a machine for grinding a cambered surface on rolls and the like having a grinding wheel and a work table relatively movable parallel to the axis of the wheel, the combination of means to support a cambered roll on the table with the tangent at the high point of camber on the roll parallel to the axis of the wheel, and with the high point of camber in the central plane through the wheel, means to effect a relative feeding movement between the roll and wheel to present other points on the cambered surface to the wheel face, said supporting means including means to impart simultaneous opposite and unequal movements to opposite ends of the roll in a radial plane of the wheel containing the wheel axis to align the tangent at each of said other points parallel to the axis of the wheel in timed relation to the feeding movement.

2. In a machine for grinding cambered surfaces on rolls and the like having a grinding wheel and a work table supported for relative movement parallel to the axis of the wheel, the combination of means on the table to support a roll with its axis parallel to the axis of the wheel and its high point of camber tangent to the wheel face, means for operatively engaging opposite ends of the roll to swivel the roll in a radial plane of the wheel containing said point of tangency to maintain the tangent at successive points on the roll parallel to the face of the wheel as the feeding movement progresses, said swiveling means including different cams, one of which imparts a greater movement to the one end of the roll than the other cam imparts, said movements being simultaneous and in opposite directions.

3. In a machine for grinding cambered surfaces on rolls and the like having a grinding wheel and a work table supported for relative movement parallel to the axis of the wheel, the combination of means on the table to support the roll with its axis parallel to the axis of the wheel and with the high point of camber on the roll tangent to the wheel at a point in the central plane of the wheel normal to its axis, and automatically operable shifting means to oppositely laterally shift the respective ends of the roll unequal amounts simultaneously in a radial plane of the wheel to align the tangent at successive points along the cambered surface parallel to the wheel face in timed relation to said feeding movement.

4. In a machine for grinding cambered surface on rolls and the like having a grinding wheel and a work table supported for relative feeding movement axially of the wheel, the combination of means on the table for supporting the roll for universal lateral movement in a radial plane of the grinding wheel containing the axes of the wheel and the roll, and power operable shifting means automatically operable in timed relation to said relative feeding movement for imparting unequal movements to opposite ends of the roll in opposite directions to maintain the tangent to the cambered surface at the point of contact of the roll with the wheel parallel to the axis of the wheel.

5. In a grinding machine having a grinding wheel and a work table supported for relative feeding movement parallel to the axis of the wheel, the combination of means for supporting cambered rolls and the like on the table for grinding a cambered surface thereon comprising means for supporting opposite ends of the roll on the table with the axis of the roll parallel to the axis of the grinding wheel and with the high point of camber on the roll tangent to the grinding wheel, said roll supporting means including swiveling means comprising rotatable cams, cam followers operatively connected to opposite ends of the rolls, and, means operable in timed relation to the feeding movement to effect rotation of said cams through equal angles for equal feed movements, said cams being shaped to impart unequal and opposite movements to the respective ends of the roll simultaneously.

6. In a machine for grinding cambered surfaces on rolls and the like having journal portions projecting from opposite ends thereof, said machine having a grinding wheel and a work table supported for relative movement parallel to the axis of the wheel, the combination of a pair of journal rests mounted on the table having means for receiving said journal portions and supporting the roll parallel to the axis of the grinding wheel, said table having a headstock and a tailstock, means between the ends of said portions and said stocks to prevent axial movement of the roll relative to the table and said journal rests, and separate rotatable cam means in the respective rest for operatively engaging the respective journal portions to move them unequal amounts in opposite directions in a radial plane of the wheel progressively during travel of the table to maintain the tangent to the roll at the point of contact with the wheel parallel to the axis of the wheel.

7. In a grinding machine having a grinding wheel and a work table supported for relative feeding movement parallel to the axis of the wheel, the combination of means on the table for supporting cambered rolls having journal portions projecting from opposite ends thereof comprising spaced journal rests positioned on the table and having means for engaging said journal portions to support the roll parallel to the axis of the grinding wheel with the high point of camber on the roll tangent to the grinding wheel, said means including laterally movable supports, rotatable cams mounted in the journal rests for operatively controlling the movement of said supports in controlled relation, said cams having parabolic contours and means responsive to the feeding movement of said table to effect power rotation of said cams in opposite directions.

8. In a machine for grinding rolls having journal portions projecting from opposite ends thereof, the combination with a grinding wheel, of a traversible work table having a pair of journal rests thereon, each journal rest having a support for engaging the journal portion of the roll and anti-frictionally supported for lateral movement as respects the axis of the wheel, a resiliently mounted backrest for engaging the journal portion of the roll on the side next to the grinding wheel to move the roll away from the grinding wheel, a rotatable cam to oppose movement by the backrest and control the lateral movement of said journal portion during traverse of the table, each cam having a parabolic contour and a prescribed neutral position from which it is rotatable in either direction, and means to rotate said cams oppositely simultaneously to effect opposite unequal movements of said journal portions.

9. In a grinding machine having a grinding wheel and a work table supported for relative feeding movement parallel to the axis of the wheel, the combination of journal rests mounted on said table having support pads for receiving the journal portions of cambered rolls to be ground, said pads being anti-frictionally supported for lateral movement, means carried by the journal rest for engaging the journal portions to effect movement thereof in a direction away from the grinding wheel, pushers mounted in said journal rest for opposing said movement and imparting movement in an opposite direction, each journal rest having a rotatable cam with a parabolic contour, and a follower mechanism operatively connected to said cam including a compound lever mechanism connected to said pusher, and means to vary the fulcrum of said lever mechanism to vary the amount of movement of the pusher with respect to the amount of movement imparted by said cam.

10. In a grinding machine having a grinding wheel and a work table supported on a bed for relative feeding movement parallel to the axis of the wheel, the combination of means for supporting a cambered roll having end journal portions on the table for grinding a cambered surface thereon comprising means for supporting the journal portions including journal rests mounted on the table, each journal rest including a laterally movable support pad, pushers mounted in said journal rests for imparting lateral movement to said journal portions, a rotatable cam mounted in each journal rest and operatively connected to the respective pusher, rack and pinion means for imparting rotation to the cams, said rack means including plungers, and sine bars mounted on the bed and operatively connected to said last-named plungers for imparting movement thereto during feeding movement of the table.

11. In a grinding machine having a grinding wheel and a work table supported for relative feeding movement parallel to the axis of the wheel, the combination of journal rests detachably mounted upon the table in spaced relation for receiving the journal portions of rolls to be ground, each journal rest including a plunger for engaging the periphery of the journal portion, an actuating lever operatively connected to said plunger, a cam for shifting said lever, an indicator dial, a nut threaded on said plunger and having means for engaging said dial to indicate the movement imparted to said plunger by the cam, and means to effect relative rotation between said nut and said plunger to set the dial in a prescribed starting position.

12. In a journal rest for supporting a roll on the table of a grinding machine for a camber grinding operation, the combination of means for detachably connecting the journal rest to the table, said journal rest including a slidable support having a V-shaped supporting surface for receiving a portion of the roll, means on the rest for engaging said portion of the roll to urge the support in one direction, a plunger for engaging the side of said portion opposite to said back rest for opposing movement thereof, a compound lever having a pivoted connection with said support and operatively connected to said lever, a rotatable cam for imparting movement to said lever, said lever having a variable fulcrum for varying the throw of said plunger, and micrometer dial mechanism operatively connected to said plunger for indicating the throw imparted thereto by the cam.

References Cited in the file of this patent

UNITED STATES PATENTS

| | | |
|---|---|---|
| 1,794,271 | Asbridge | Feb. 24, 1931 |
| 1,970,000 | Dunbar | Aug. 14, 1934 |
| 2,040,820 | Belden | May 19, 1936 |

FOREIGN PATENTS

| | | |
|---|---|---|
| 464,455 | Great Britain | Apr. 19, 1937 |